(12) United States Patent
Uzawa et al.

(10) Patent No.: US 8,186,594 B2
(45) Date of Patent: May 29, 2012

(54) IMAGE PROCESSING METHOD AND APPARATUS THEREOF

(75) Inventors: Mitsuru Uzawa, Hachioji (JP); Sanae Ikeda, Yokohama (JP); Jun Nagai, Tokyo (JP); Junya Arakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1122 days.

(21) Appl. No.: 11/585,249

(22) Filed: Oct. 24, 2006

(65) Prior Publication Data

US 2007/0188781 A1 Aug. 16, 2007

(30) Foreign Application Priority Data

Oct. 26, 2005 (JP) .................................. 2005-311803

(51) Int. Cl.
*G06K 7/10* (2006.01)
*G06K 9/18* (2006.01)

(52) U.S. Cl. ................. 235/462.09; 235/375; 235/462.1; 235/487; 235/494; 358/1.1; 358/1.2; 358/1.9; 382/286; 382/298

(58) Field of Classification Search .................. 235/375, 235/462.09, 487, 494, 462.1; 358/1.1, 1.2, 358/1.9; 382/286, 298
See application file for complete search history.

(56) References Cited

U.S. PATENT DOCUMENTS

| | | | |
|---|---|---|---|
| 6,279,830 B1 | 8/2001 | Ishibashi | |
| 6,283,647 B1 | 9/2001 | Konishi et al. | |
| 6,726,104 B2 * | 4/2004 | Schuessler et al. | 235/462.09 |
| 6,918,539 B2 | 7/2005 | Nakajima et al. | |
| 6,983,886 B2 | 1/2006 | Natsukari et al. | |
| 7,104,451 B1 * | 9/2006 | McCartney | 235/462.01 |
| 2002/0036799 A1 * | 3/2002 | Sumiyama et al. | 358/1.15 |
| 2004/0046024 A1 * | 3/2004 | Natsukari et al. | 235/454 |
| 2005/0224572 A1 * | 10/2005 | Kelley et al. | 235/375 |

FOREIGN PATENT DOCUMENTS

| | | |
|---|---|---|
| JP | 3062291 A | 3/1991 |
| JP | 5054165 A | 3/1993 |
| JP | 9030054 A | 2/1997 |
| JP | 09-185209 | 7/1997 |
| JP | 10324023 A | 12/1998 |
| JP | 2000148922 A | 5/2000 |
| JP | 2000285192 A | 10/2000 |
| JP | 2001138563 A | 5/2001 |
| JP | 2002127487 A | 5/2002 |
| JP | 2004053966 A | 2/2004 |
| JP | 2004078896 A | 3/2004 |

OTHER PUBLICATIONS

Japanese Office Action dated Feb. 18, 2011 in corresponding Japanese Application No. 2005-311803.
Japanese Office Action dated Nov. 19, 2010 in corresponding Japanese Application No. 2005-311803.
Office Action dated Nov. 14, 2011 in corresponding Japanese Application No. 2011-093500.

* cited by examiner

*Primary Examiner* — Ali Sharifzada
(74) *Attorney, Agent, or Firm* — Fitzpatrick, Cella, Harper & Scinto

(57) ABSTRACT

The characteristic variations of a printer largely influence the recognition precision of code information, and the recognition precision of code information appended to printed matter cannot often be guaranteed depending on printers. To solve this problem, a printer forms a predetermined chart, and the image forming characteristics of the printer are detected from the code information recorded on the chart. A generation method of generating code information obtained by encoding information to a regular sequence of a pixel cluster is controlled in accordance with the image forming characteristics.

9 Claims, 18 Drawing Sheets

F I G. 3

ERROR CORRECTION AMOUNT: MIDDLE

| QUALITY STANDARD Y | COPY GENERATION X | | |
|---|---|---|---|
| | THIRD GENERATION | SECOND GENERATION | FIRST GENERATION |
| A | CELL SIZE 10 OR MORE | CELL SIZE 8 OR MORE | CELL SIZE 7 OR MORE |
| B | CELL SIZE 6 OR MORE | CELL SIZE 5 OR MORE | CELL SIZE 5 OR MORE |
| C | CELL SIZE 4 OR MORE | CELL SIZE 3 OR MORE | CELL SIZE 3 OR MORE |

F I G. 10
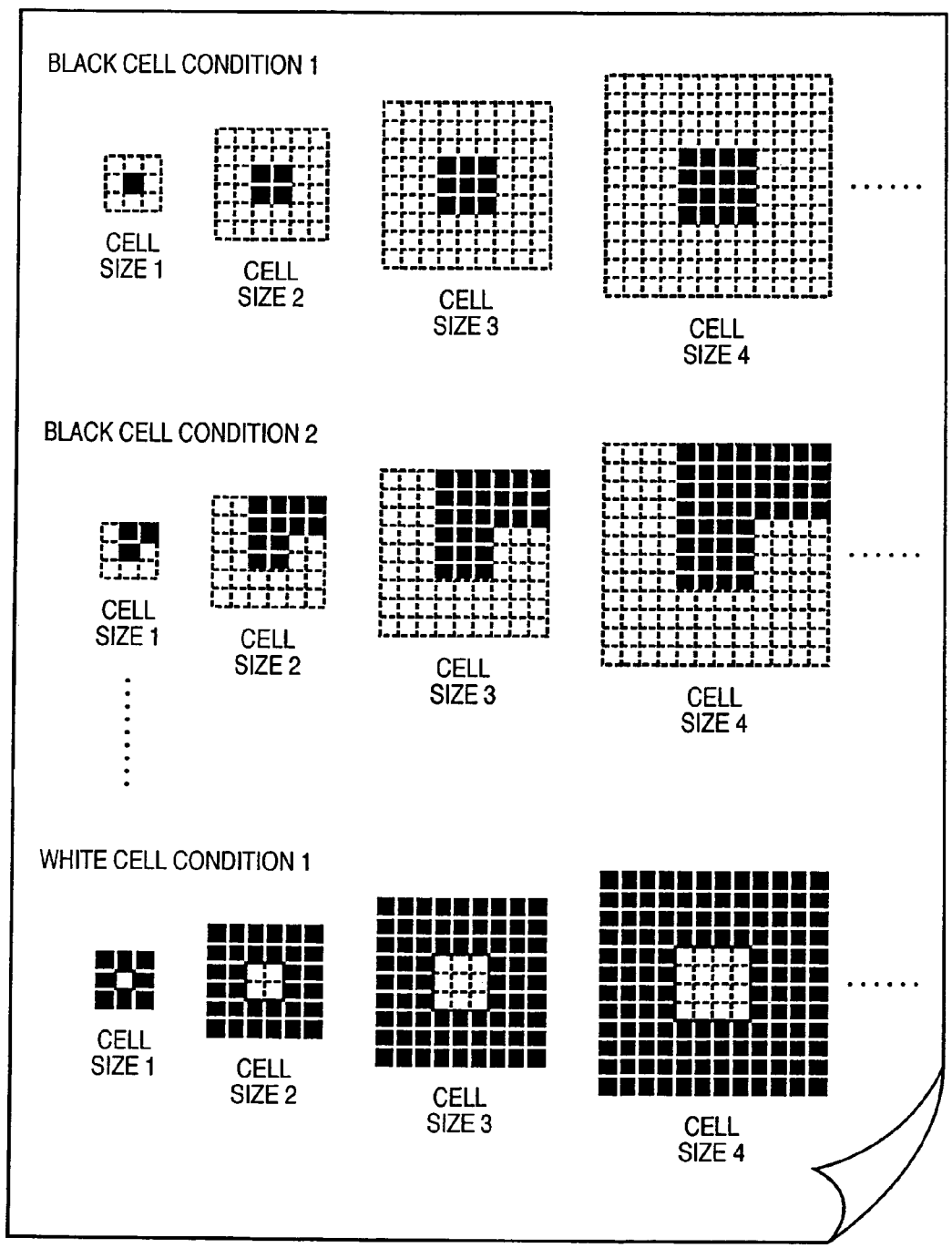

FIG. 15

| | 1 | 2 | 3 | 4 | 5 | 6 | 7 | 8 | 9 | 10 | 11 | 12 |
|---|---|---|---|---|---|---|---|---|---|---|---|---|
| CELL SIZE | F | F | A | A | A | A | A | A | A | A | A | A |
| DECODING | C | C | B | B | A | A | A | A | A | A | A | A |
| SYMBOL CONTRAST | D | C | C | C | B | B | B | A | A | A | A | A |
| EXPANSION OR CONTRACTION OF MODULE | C | C | C | B | B | B | A | A | A | A | A | A |
| NONUNIFORMITY OF AXIS | F | F | F | D | C | C | B | A | A | A | A | A |
| UNUSED ERROR CORRECTION | F | F | F | D | C | C | B | A | A | A | A | A |

| | |
|---|---|
| COMPREHENSIVE EVALUATION | A |

F I G. 18

IMAGE PROCESSING METHOD AND APPARATUS THEREOF

BACKGROUND OF THE INVENTION

1. Field of the Invention

The present invention relates to image processing for generating code information by encoding information into a regular sequence of a pixel cluster.

2. Description of the Related Art

An information description method for printing code information that requires some decoding processing for source information in place of readable information such as text or the like, the contents of which can be easily recognized, is prevailing. A representative example of such code information is a two-dimensional code like a QR code®.

An application program or the like, which runs on a computer, normally encodes source information such as text or the like, and sends code information to a printer, thus printing the code information on a print medium such as paper sheet or the like.

The contents of the printed code information cannot be recognized intact. However, when the code information is scanned as an image using a scanner, and that image undergoes decoding processing, readable information can be obtained. An application program which runs on a computer performs the decoding processing by inputting the scanned image to the computer. Alternatively, for example, a decoder like a portable phone that supports the two-dimensional code or a multi-functional peripheral equipment (MFP) having a scanning device such as a scanner or the like may decode the image.

The two-dimensional code (code information by encoding information into a regular sequence of a pixel cluster) generally has an information area as a minimum unit that forms the code (to be referred to as "cell" hereinafter). By arranging two types of cells which are defined in advance according to rules defined in advance, readable information is encoded. Normally, the two types of cells include a black cell that prints black, and a white cell that prints nothing. Therefore, when the data size of source information to be encoded (to be referred to as a "source information size" hereinafter) is large, the number of cells increases accordingly, and the data size of the encoded information (to be referred to as a "code size" hereinafter) becomes large.

Upon printing code information on a print medium as a two-dimensional code, each cell is formed as a pixel cluster including a predetermined number of pixels. In this case, if the source information size remains the same, the code size increases with increasing number of pixels per cell, i.e., with increasing cell size. That is, the final code size is influenced by two factors, i.e., the source information size and the cell size. Note that the source information often includes additional information (error correction code or the like) required in the process of encoding the source information and in the process of decoding in addition to the source information itself.

Also, as is known, slight dot fattening and thickening in an output device greatly influences the recognition precision of the code information. In consideration of recognition of code information by an MFP, code information which is appended to printed matter by the MFP must be analyzed by the MFP. Hence, the code information must be generated based on generation parameters (a cell size, cell shape, error correction amount, and the like) which consider copy degradation resistance of the MFP itself, and the generated code information must be embedded in the sheet surface. Note that the copy degradation resistance refers to resistance that allows decoding code information even using a second generation copy formed by repeated copying.

However, the print characteristics of the MFP vary depending on individual differences, environmental changes, aging, and the like. Such characteristic variations greatly influence the recognition precision of the code information, and the high recognition precision of the code information appended to printed matter by the MFP cannot often be guaranteed.

As a technique for suppressing the characteristic variations of the MFP, calibration is well-known. The calibration is a technique in which the MFP outputs a test chart, and scans it. Color differences are calculated between the data of the scanning result and those of the test chart, thus correcting image processing conditions and supply signals of color materials (toners or inks) (for example, see Japanese Patent Application Laid-Open No. 9-185209).

However, the calibration is a technique for correcting an image itself, but it does not guarantee recognition precision by correcting the generation method and appending method of code information to be appended to printed matter. For this reason, the cell size as a dominant generation parameter for improving the copy degradation resistance has a large margin, and code information such as a two-dimensional code is printed.

However, when the cell size has a large margin, the following problems are posed: the code size increases, printing of code information with a large cell size makes the printed matter unsatisfactory to the viewer, the degree of freedom in layout of code information deteriorates, and so forth.

SUMMARY OF THE INVENTION

The first aspect of the present invention discloses an image processing method comprising the steps of: generating code information by encoding information to a regular sequence of a pixel cluster; making a printer form an image obtained by appending the code information to image data; making the printer form a predetermined chart, and detecting image forming characteristics of the printer from the code information recorded on the chart; and controlling a generation method of the code information in the generation step in accordance with the image forming characteristics.

According to the present invention, code information which has a smaller cell size can be generated when print quality is guaranteed. Therefore, since no margin is provided to the cell size, the following problems can be suppressed: the code size increases, printing of code information with a large cell size makes the printed matter unsatisfactory to the viewer, the degree of freedom in layout of code information deteriorates, and so forth.

Further features of the present invention will become apparent from the following description of exemplary embodiments with reference to the attached drawings.

BRIEF DESCRIPTION OF THE DRAWINGS

FIG. 3 shows an example of a parameter table;

FIG. 10 shows an example of an adjustment chart;

FIG. 15 shows an example of the evaluation results of the symbol qualities of an Xth generation copy;

FIG. 18 is a view for explaining an example of the processing for updating a cell shape table in accordance with fattening or thickening information.

DESCRIPTION OF THE EMBODIMENTS

Image processing according to preferred embodiments of the present invention will be described in detail hereinafter with reference to the accompanying drawings.

First Embodiment
Overview of Image Processing Apparatus

Figure 1:
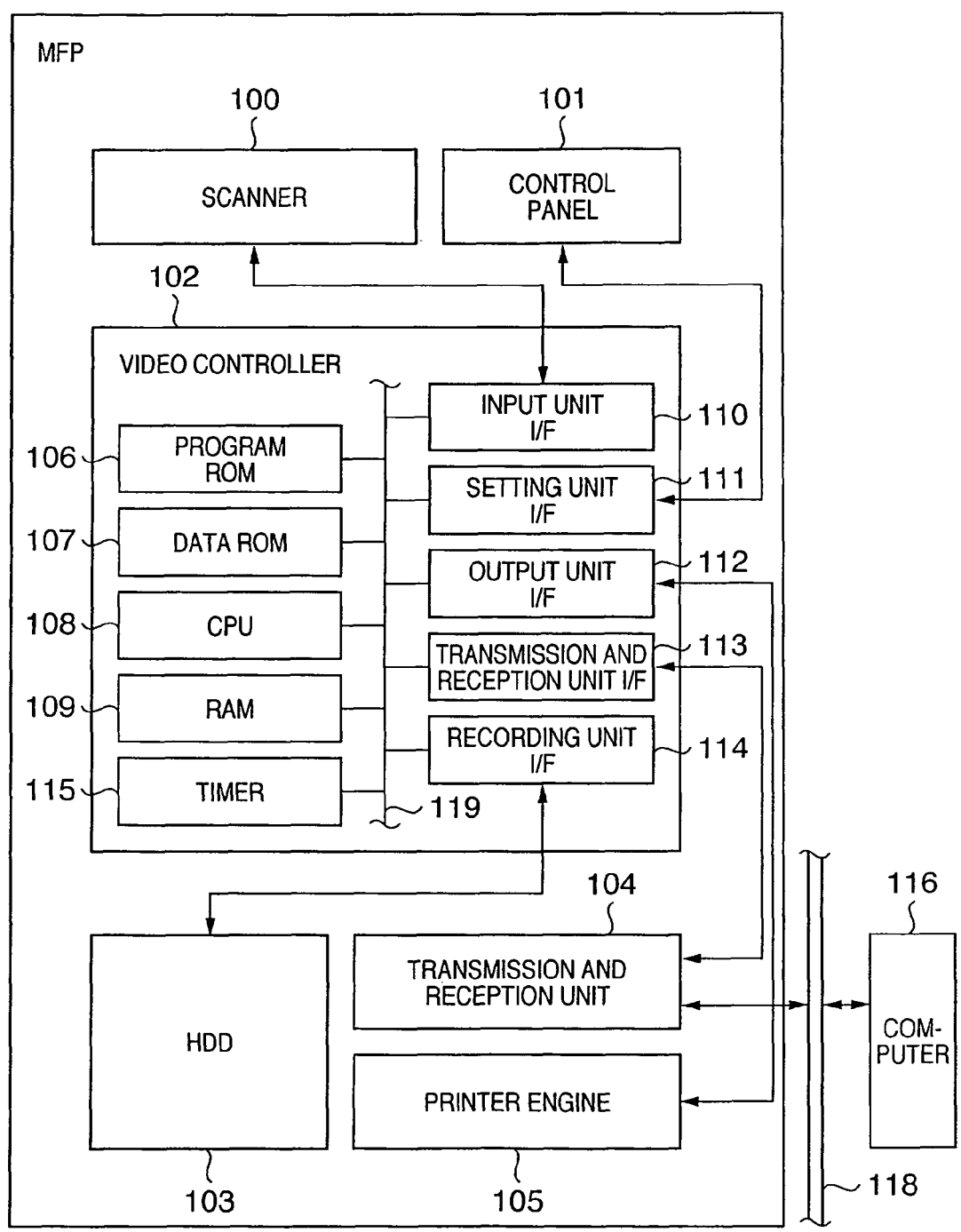
FIG. 1 is a block diagram showing the arrangement of an MFP according to one embodiment of the present invention.

FIG. 1 is a block diagram showing the arrangement of an MFP of this embodiment.

A video controller 102 executes image processing and various kinds of control in accordance with an instruction input from a control panel 101 which comprises an LCD and touch panel. For example, upon reception of a copy instruction, the video controller 102 scans a document image using a scanner 100, applies image processing to the scanned image, and outputs the processed image to a printer engine 105. Upon reception of a facsimile (FAX) transmission instruction, the video controller 102 scans a document image using the scanner 100, applies image processing to the scanned image, and outputs the processed image to a transmission and reception unit 104.

Upon reception of a network print instruction from a computer 116 via a network 118, the video controller 102 receives a print job using the transmission and reception unit 104, applies image processing to the scanned image, and outputs the processed image to the printer engine 105. Upon reception of a network scan instruction from the computer 116, the video controller 102 scans a document image using the scanner 100, applies image processing to the scanned image, and outputs the processed image to the transmission and reception unit 104.

Furthermore, the video controller 102 applies image processing to a FAX image received via a telephone line (not shown), and outputs the processed image to the printer engine 105.

The video controller 102 saves image data in a storage device 103 such as a hard disk drive (HDD) or the like as needed upon execution of the above processing. Also, the video controller 102 saves image in the HDD 103 upon reception of an image data save instruction from the control panel 101 or computer 116.

A CPU 108 of the video controller 102 executes data processing and control programs stored in a program ROM 106 or HDD 103 using a RAM 109 as a work memory, and controls respective components of the MFP via a system bus 119. An input unit interface (I/F) 110 serves as an interface with the scanner 100. A setting unit I/F 111 serves as an interface with the control panel. An output unit I/F 112 serves as an interface with the printer engine 105. A transmission and reception I/F 113 serves as an interface with the transmission and reception unit 104. A storage unit I/F 114 serves as an interface with the HDD 103. A timer 115 provides a timepiece function.

The control panel 101 is also used to set the operation conditions of the MFP, and to display its operation status.

Print Code Information

Figure 2:
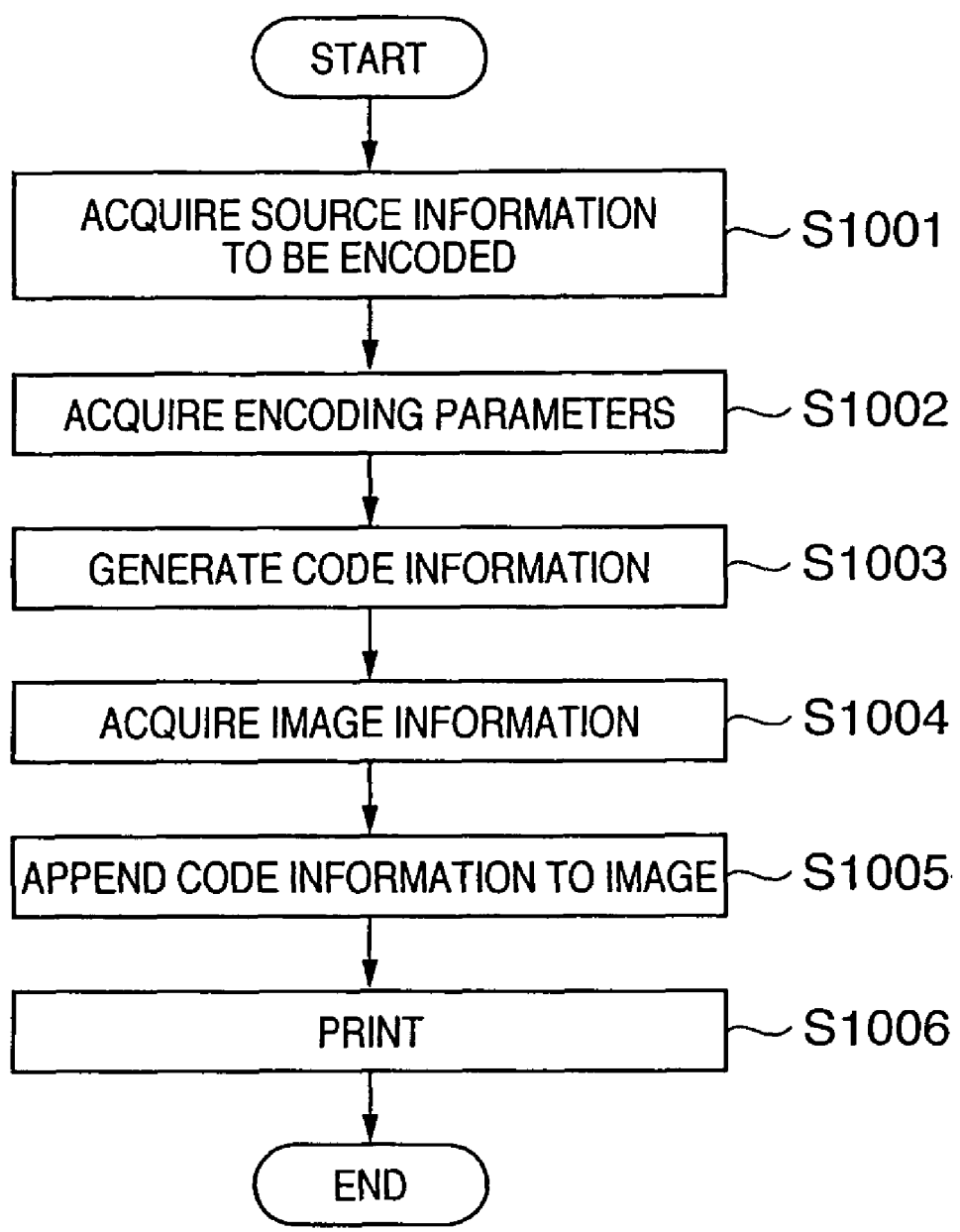
FIG. 2 is a flowchart for explaining printing of code information.

FIG. 2 is a flowchart for explaining printing of code information. The CPU 108 executes this processing.

The CPU 108 acquires source information to be encoded into code information (S1001). The administrator of the MFP (to be simply referred to as "administrator" hereinafter) inputs the source information using the control panel 101, or a dedicated application, printer driver, or the like (to be referred to as "application" hereinafter) on the computer 116 which can be connected to the MFP. As the source information, information such as text or the like may be directly input, or the data storage location (e.g., the path name of a file saved in a server on the network 118, the HDD 103, or a local drive of the computer 116) may be designated. Upon designation of the data storage location, the CPU 108 or application downloads that file. Alternatively, the source information may be designated as meta information such as a user ID, date and time, print job ID, or the like.

The CPU 108 acquires encoding parameters (S1002). The encoding parameters include meta parameters designated by the user or administrator, and generation parameters acquired from a table held by the MFP or computer 116. The meta parameters are used upon acquiring the generation parameters from the table. The user or administrator inputs the meta parameters via the control panel 101 or application. Note that the meta parameters are not particularly limited as long as the user or administrator can intuitively recognize them and have relations with the generation parameters.

This embodiment uses "X" upon forming an Xth generation copy by the MFP and quality "Y" of code information at that time as the meta parameters. As the quality of the code information, for example, print quality based on JIS X 0510 of Japanese Industrial Standard is used. This print quality is a scheme which derives a final evaluation result by evaluating five types of indices, i.e., decodability, a use size of an error correction amount, fattening and thickening of a cell, distortion of an axis, and symbol contrast, and can evaluate code information such as a two-dimensional code or the like from a comprehensive perspective.

That is, the CPU 108 acquires the generation parameters from a table indicating the relationship between the meta parameters and generation parameters (to be referred to as "parameter table" hereinafter) based on the meta parameters "X, Y" (S1002). In this case, the generation parameters include an error correction amount and cell size.

The error correction amount represents a correctable error amount upon executing wrong decoding due to contamination of code information or the like. If the error correction amount is increased, the code information is robust against contamination and the like, but the area of the code information becomes larger since error correction information is included. Note that the error correction method includes a Reed Solomon code, LDPC (low density parity check) code, and the like. Also, the cell size is the size of a cell as the information area of a minimum unit which forms the code information.

FIG. 3 shows an example of the parameter table which indicates cell sizes corresponding to the meta parameters "X, Y" when the error correction amount is "middle".

Tables shown in FIG. 3 are prepared in correspondence with respective error correction amounts, and optimal cell sizes are available for respective error correction amounts. The code size is determined based on the error correction amount and cell size. As the code size decreases, the appearance of printed matter can be prevented from deteriorating and the degree of freedom in layout of code information increases. Hence, the CPU 108 acquires a combination corresponding to a minimum code size of those of error correction amounts and optimal cell sizes as the generation parameters. A method of generating the parameter table will be described later.

The CPU 108 generates code information by encoding the source information based on the generation parameters (S1003).

Figure 4:
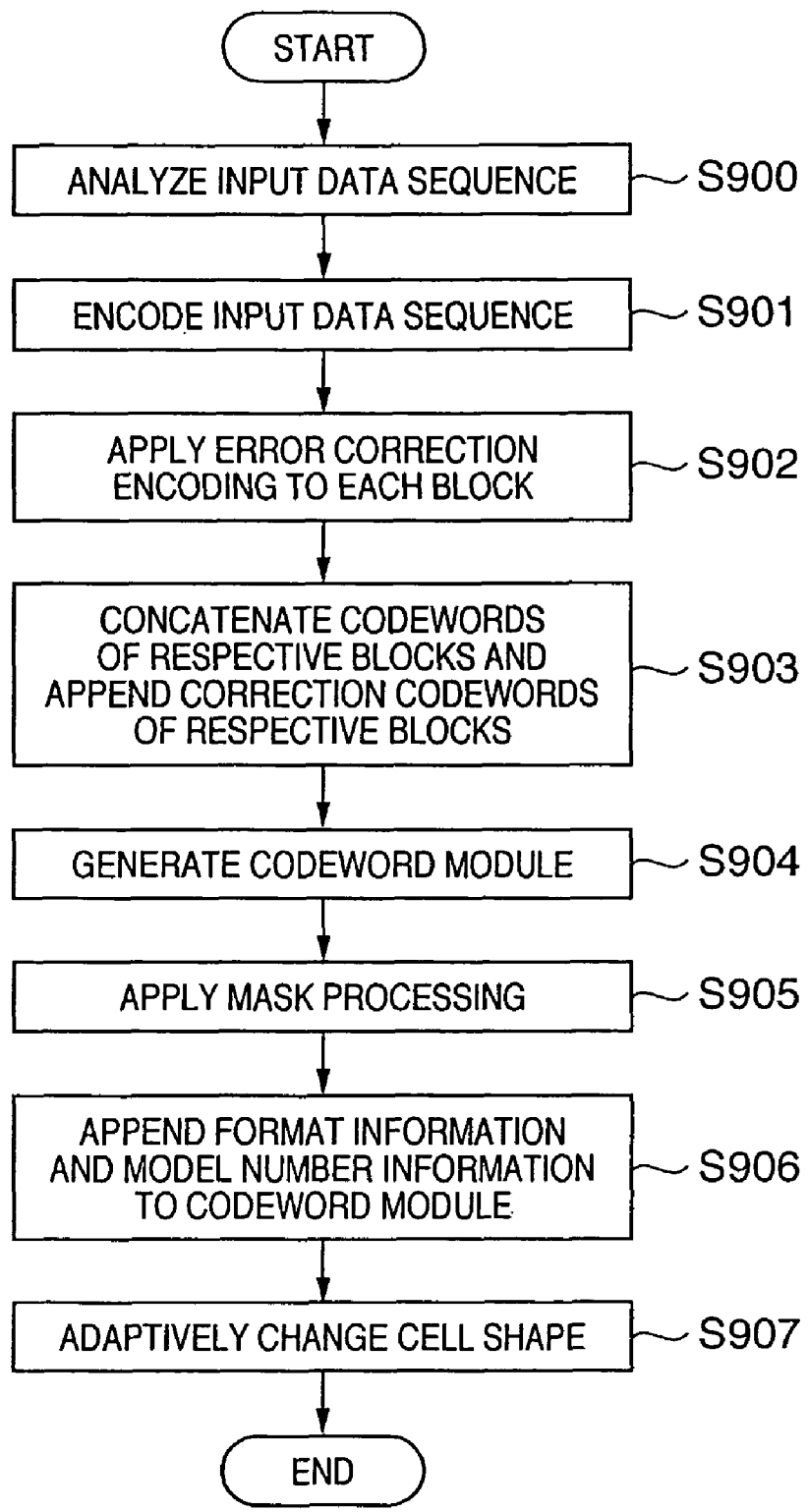
FIG. 4 is a flowchart showing the processing for generating a symbol of code information by encoding source information of a character string.

FIG. 4 is a flowchart showing the processing (S1003) for generating a symbol (JIS X 0510) of code information by encoding source information of a character string.

The CPU 108 analyzes an input data sequence used to identify characters of different types. The CPU 108 selects error detection and error correction amounts, and selects a minimum model number that can accommodate the input data sequence and error correction information (S900).

The CPU 108 then converts the input data sequence into a predetermined bit sequence, and converts the bit sequence into data codewords of a predetermined number of bits by appending a specifier indicating a mode (numeric, alphanumeric, 8-bit bytes, kanji, etc.) of data and a termination pattern as needed (S901). Next, in order to attain error correction, the CPU 108 divides the data codeword sequence into a predetermined number of blocks, generates error correction codewords for respective blocks, and appends them after the data codeword sequence (S902).

The CPU 108 concatenates the data codeword sequences of respective blocks obtained in step S902, and also appends error correction codewords, and remainder codewords as needed after the concatenated data codeword sequence (S903).

Next, the CPU 108 generates a codeword module by arranging position detection patterns, a finder pattern, a timing pattern, an alignment pattern, and the codeword sequence in a matrix (S904). The CPU 108 then selects an optimal mask pattern for an encoded region of the symbol, and calculates the exclusive logical sum (XOR) of the mask pattern and the codeword module obtained in step S904, thus masking the codeword module (S905).

The CPU 108 generates format information and model information of the codeword module masked in step S905, and appends them to the codeword module to generate code information (S906). Finally, the CPU 108 adaptively changes the cell shape that forms the code information obtained in step S906 (S907).

Normally, generation of the code information ends in step S906. However, this embodiment comprises step S907 to generate optimal code information according to the performance of the MFP. The code information obtained in step S906 is perfect one as digital data. However, upon printing the code information, deformations such as expansion, contraction, or the like of cells occur depending on the printer characteristics, and an ideal cell shape cannot often be obtained. Hence, in order to reduce the cell deformations, the cell shape is digitally and adaptively changed so that the cell shape after printing approaches an ideal shape.

As the types of cells, there are only two types, i.e., white and black cells as digital data. However, the deformations of the printed cell change depending on the conditions of surrounding cells in addition to only the difference between the white and black cells. Hence, the CPU 108 changes each cell of the code information generated in step S906 to an optimal cell shape with reference to a table which determines an optimal cell shape for each cell size.

Figure 5:
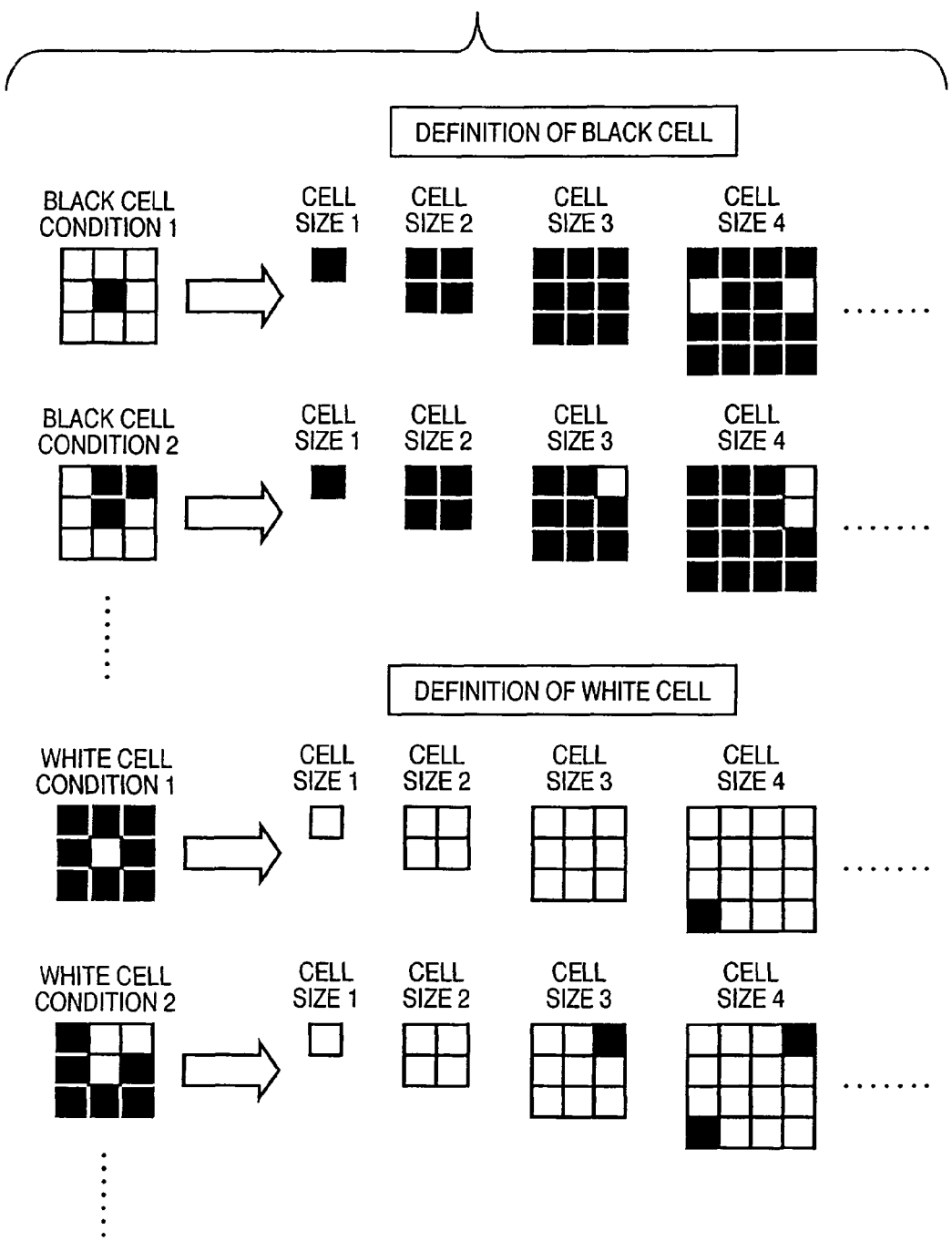
FIG. 5 is a view for explaining definitions of optimal cell shapes for respective cell sizes in accordance with cell conditions.

FIG. 5 is a view for explaining the definitions of optimal cell shapes for respective cell sizes. Using a table corresponding to the definitions shown in FIG. 5, the CPU 108 changes an interest cell to an optimal cell shape according to the conditions of its surrounding eight cells. Note that generation of this table will be described later.

Referring back to FIG. 2, the CPU 108 acquires image information (S1004). The image information to be acquired includes an image obtained by scanning a document image by the scanner 100, an image received from the computer 116 or the like via the network 118, a FAX-received image, and the like.

The CPU 108 appends the code information to the acquired image (S1005). When the user or administrator designates in advance the appending position of the code information via the control panel 101 or the application on the computer 116, the CPU 108 appends the code information to the designated position on the image. Upon appending the code information, useful information on the image may disappear. To avoid this, the CPU 108 may forcibly reduce the image to form a blank region (margin), and may make the user or administrator designate the position of the blank region as the appending position to append the code information. If no appending position is designated, the CPU 108 searches for an appropriate blank region, and appends the code information there.

Figure 6:
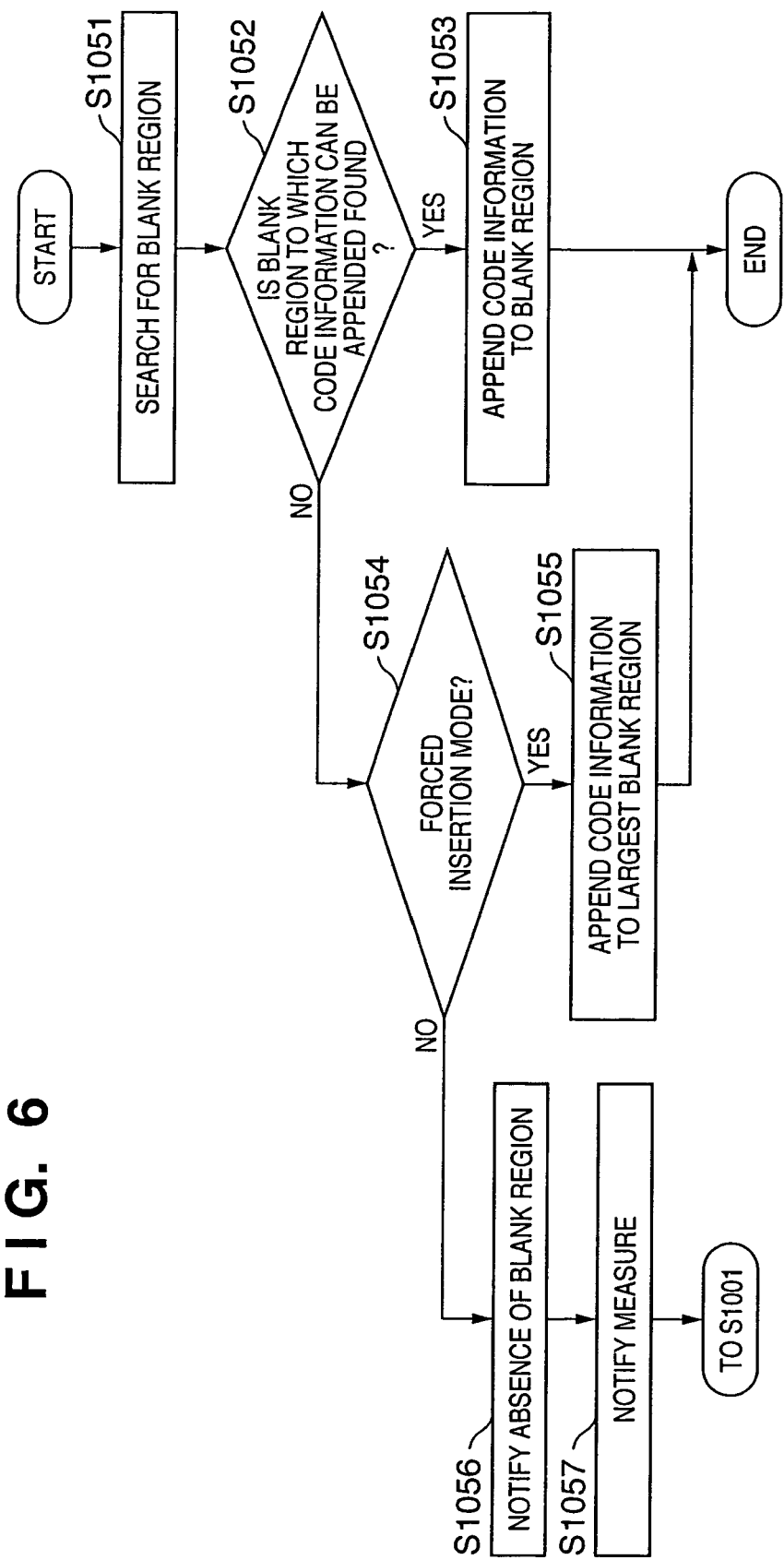
FIG. 6 is a flowchart showing the appending sequence of code information.

FIG. 6 is a flowchart showing the appending sequence of the code information.

The CPU 108 searches for blank regions of the image (S1051). The blank region is a region such as a white part of an image, a background part, or the like where no useful information exists. In this case, in order to improve the search efficiency, the CPU 108 may downsample the image, and may conduct a search using the image with a lower resolution.

The CPU 108 checks if the detected blank regions include a blank region which has an area large enough to append the code information (S1052). If such blank region is found, the CPU 108 appends the code information to that blank region (S1053).

On the other hand, if no blank region having an area large enough to append the code information is found, the CPU 108 checks if the administrator sets a forced insertion mode (S1054). The forced insertion mode is a function of forcibly inserting a print date, print job ID, and user ID of the user as the code information for the purpose of management of printed matters. The administrator can designate the forced insertion mode from the control panel 101 or the application on the computer 116.

If the forced insertion mode is set, the CPU 108 searches for a blank region which has a low degree to impair useful information and a maximum area is searched for, and appends the code information to the blank region (S1055). Alternatively, the CPU 108 may reduce the image to forcibly form a blank region to which the code information can be appended, and may append the code information there.

If the forced insertion mode is not set, the CPU 108 notifies the user of the absence of any blank region to which the code information can be appended (S1056). This notification is made using the control panel 101 or the computer 116 (e.g., by displaying a message on its monitor). In this case, a user interface that suits user's needs may be used. Then, the CPU 108 presents measures to be taken to print the code information within the blank region using the same user interface as that used in notification (S1057). For example, measures for lowering the target copy degradation resistance and quality setting value, reducing an information size to be encoded in the code information, and the like may be taken. The CPU 108 presents these measures and specific numerical values to the user. Also, the CPU 108 presents that a method of reducing the image and inserting the code information is also available. After step S1057, the process returns to step S1001 in FIG. 2 to redo the processes in step S1001 and subsequent steps. However, it is preferable that the user can be prevented from repeating settings for printing code information, so that settings to be changed need only be changed.

Referring back to FIG. 2, the CPU 108 prints the image appended with the code information (S1006). This print processing is done using the printer engine 105 in the same manner as normal print processing.

The processing sequence for printing the code information has been described. With this sequence, the image appended with the code information which meets quality that the user or administrator demands can be printed.

Decode Code Information

Figure 7:
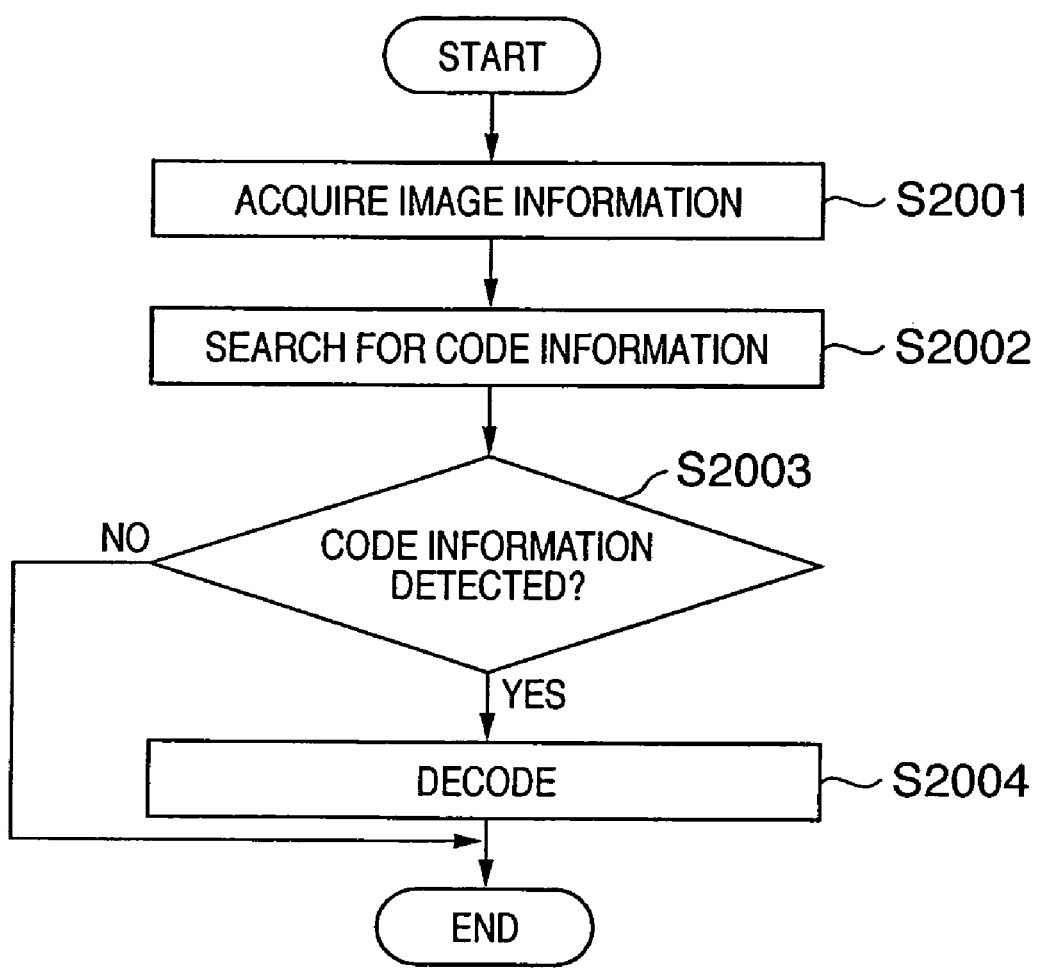
FIG. 7 is a flowchart for explaining decoding of code information.

FIG. 7 is a flowchart for explaining decoding of the code information. The CPU 108 executes this processing.

The CPU 108 acquires image information first (S2001). The image information to be acquired includes an image obtained by scanning a document image by the scanner 100, an image received from the computer 116 or the like via the network 118, a FAX-received image, and the like.

The CPU 108 searches for code information (S2002), and checks if the code information is detected (S2003).

Normally, the code information includes a feature for search, and the code information included in the image is searched for using that feature as a clue. For example, the position detection patterns for search of a QR code® include identical position detection element patterns which are arranged at three out of the four corners of the code information. In this case, in order to improve the search efficiency, the image may be downsampled to use an image with a low resolution in a search.

If no code information is detected, the processing ends. If the code information is detected, the CPU 108 decodes the code information (S2004).

Figure 8:
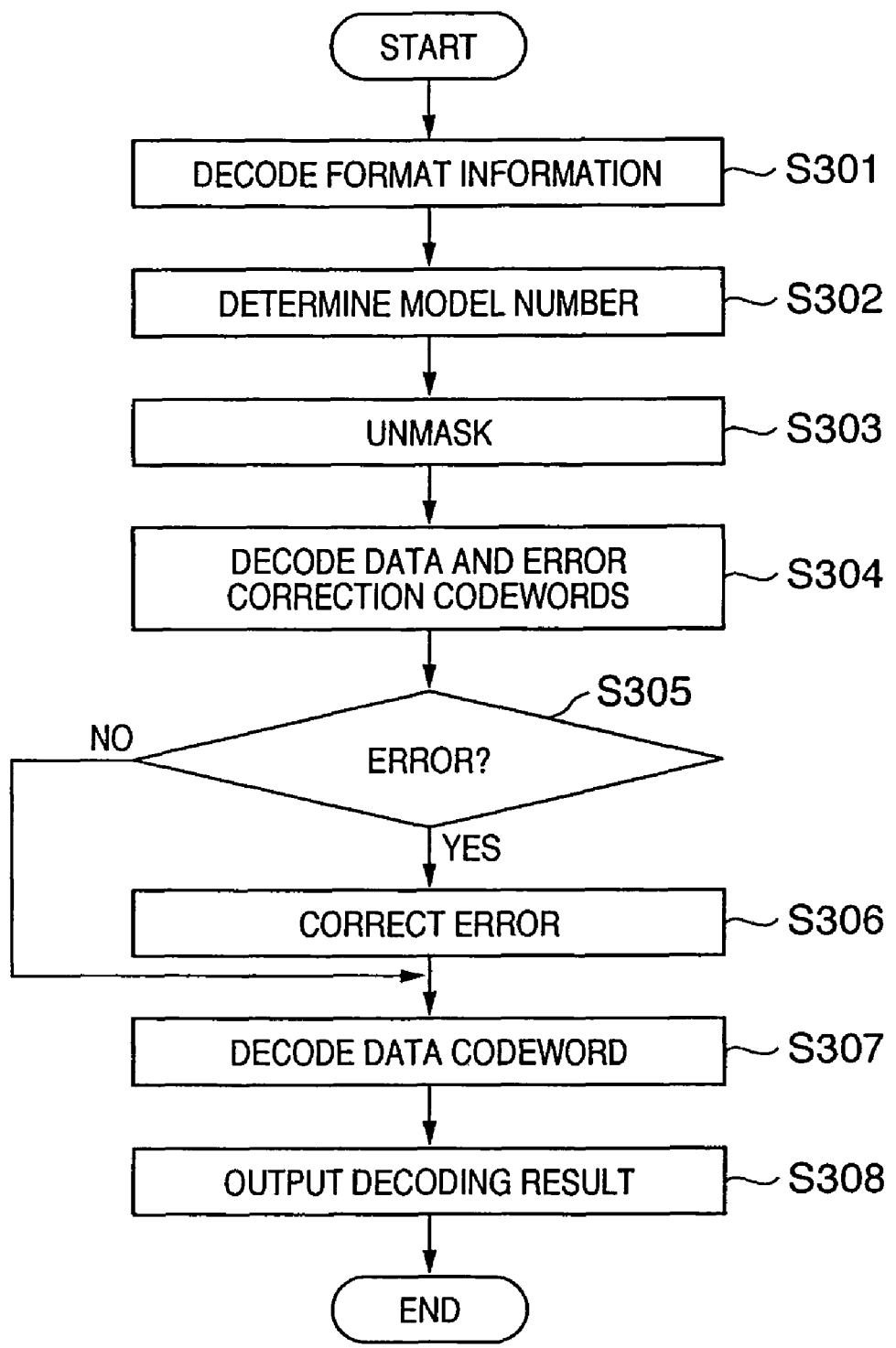
FIG. 8 is a flowchart for explaining decode of code information taking a QR code® as an example.

FIG. 8 is a flowchart for explaining decoding of the code information taking the QR code® as an example.

The CPU 108 decodes format information which neighbors the detected position detection patterns to obtain an error correction level and mask pattern which are applied to the code information (S301). The CPU 108 determines the model number of the code information (S302), and unmasks the code information by calculating the exclusive logical sum (XOR) of the encoded region bit pattern using the mask pattern obtained from the format information (S303).

The CPU 108 reads symbol characters according to layout rules corresponding to the model number, and decodes data and error codewords (S304). The CPU 108 then detects data errors (S305), and corrects detected errors (S306).

The CPU 108 divides the data into segments based on the mode specifier and character count specifier to decode data codewords (S307). Finally, the CPU 108 decodes the data codewords into characters, and outputs the decoded characters (S308).

The decoded code information is used to reflect its decoding result in image processing, to display the decoded character string on the user interface, and so forth. In this way, the user or administrator can effectively use the code information.

Calibration Associated with Code Information

Calibration associated with code information to guarantee high recognition precision when the MFP suffers characteristic variations will be described below.

This embodiment will explain an example of calibration for adjusting the parameter table shown in FIG. 3 and the table corresponding to the definitions shown in FIG. 5, so as to adjust them to the print characteristics and print state of the printer engine 105. In the following description, the parameter table shown in FIG. 3 will be called a "cell size determination table", and the table corresponding to the definitions shown in FIG. 5 will be called a "cell definition table".

These tables are desirably adjusted by determining an optimal cell size by adjusting the cell definition table first, and then determining a cell size according to the ability of a device by adjusting the cell size determination table. However, the adjustment order is not limited to such specific order, and either of these tables may be adjusted first.

The cell definition table and cell size determination table are held in the HDD 103. The administrator instructs to execute calibration associated with the code information using the control panel 101. In response to this instruction, the CPU 108 executes an adjustment program stored in the program ROM 106 or HDD 103 to adjust these tables, and updates the tables in the HDD 103.

Adjustment of Cell Definition Table

Figure 9:
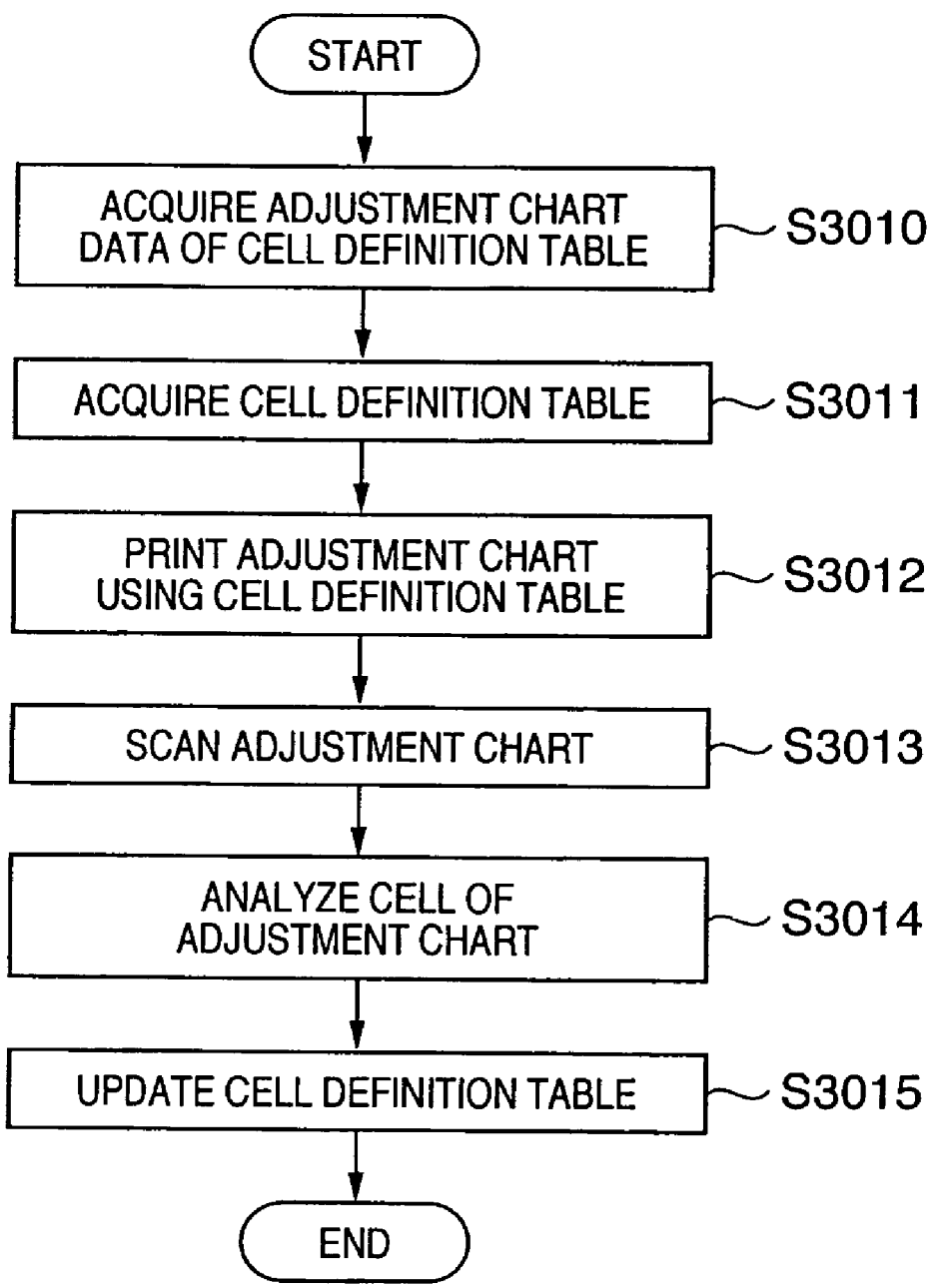
FIG. 9 is a flowchart for explaining adjustment of a cell definition table.

FIG. 9 is a flowchart for explaining adjustment of the cell definition table.

The CPU 108 acquires adjustment chart data of the cell definition table from the data ROM 107 or HDD 103 (S3010).

FIG. 10 shows an example of the adjustment chart. The adjustment chart is obtained by printing all patterns (see FIG. 5) of cells expressed by the cell definition table.

The CPU 108 acquires the cell definition table of the printer engine 105 from the data ROM 107 or HDD 103 (S3011). Note that the adjusted cell definition table is stored in the HDD 103, but a default (unadjusted) cell definition table is stored in the data ROM 107.

The CPU 108 outputs the adjustment chart data to the printer engine 105 using the acquired cell definition table, and prints the adjustment chart (S3012). The CPU 108 scans the image of the printed adjustment chart using the scanner 100, and records the read image of the adjustment chart in the RAM 109 as an image recording signal (S3013). The CPU 108 analyzes cells of the adjustment chart expressed by the image recording signal (S3014), and updates the cell definition table based on the analysis result (S3015).

Figure 11A:
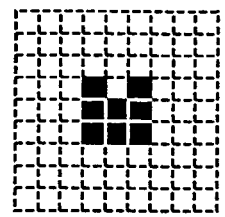
FIGS. 11A to 11E are views for explaining cell analysis of the adjustment chart and updating of the cell definition table.
Figure 11B:
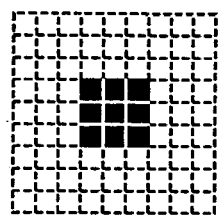
Figure 11C:
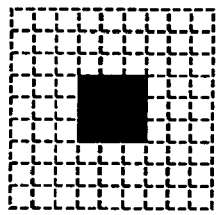
Figure 11D:
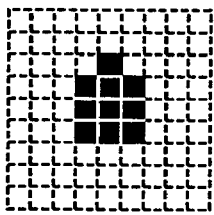

FIGS. 11A to 11E are views for explaining analysis (S3014) of a cell of the adjustment chart and updating (S3015) of the cell definition table. FIG. 11A shows an example of cells which are expressed as the image recording signal and have black cell condition 1 and cell size 3 (see FIG. 5). FIG. 11B shows a cell shape obtained by binarizing the image recording signal shown in FIG. 11A. FIG. 11C shows an ideal cell shape. FIG. 11D shows a cell shape set in the cell definition table.

Figure 11E:
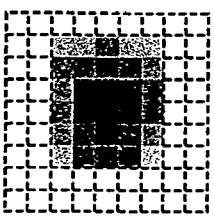

The definition of a new cell shape shown in FIG. 11E is generated by reflecting a signal obtained based on the difference between the binary cell shape (FIG. 11B) and the ideal cell shape (FIG. 11C) on the defined cell shape (FIG. 11D).

Reflecting the difference on the defined cell shape is to trace black pixels in the horizontal and vertical directions and to detect the increments/decrements of the black pixels with respect to the ideal cell shape (FIG. 11C) as the difference. If the detected difference is an increment of +1 at the center of, e.g., the right side, a black pixel at the center of the right side of the defined cell shape (FIG. 11D) is decremented by −1 by an inverse calculation, thus generating a new cell shape definition (FIG. 11E).

The above adjustment is applied to all cell shapes expressed by cell conditions and cell sizes, thus deriving an optimal cell shape to the current print performance of the printer engine 105.

The adjustment of the cell definition table can obtain a desired adjustment result if it is executed once. However, in order to obtain an adjustment result with higher precision, the adjustment may be executed a plurality of times. For example, the adjustment may be repeated until the binary cell shape obtained from the scanning result of the adjustment chart matches the ideal cell shape.

Adjustment of Cell Size Determination Table

Figure 12:
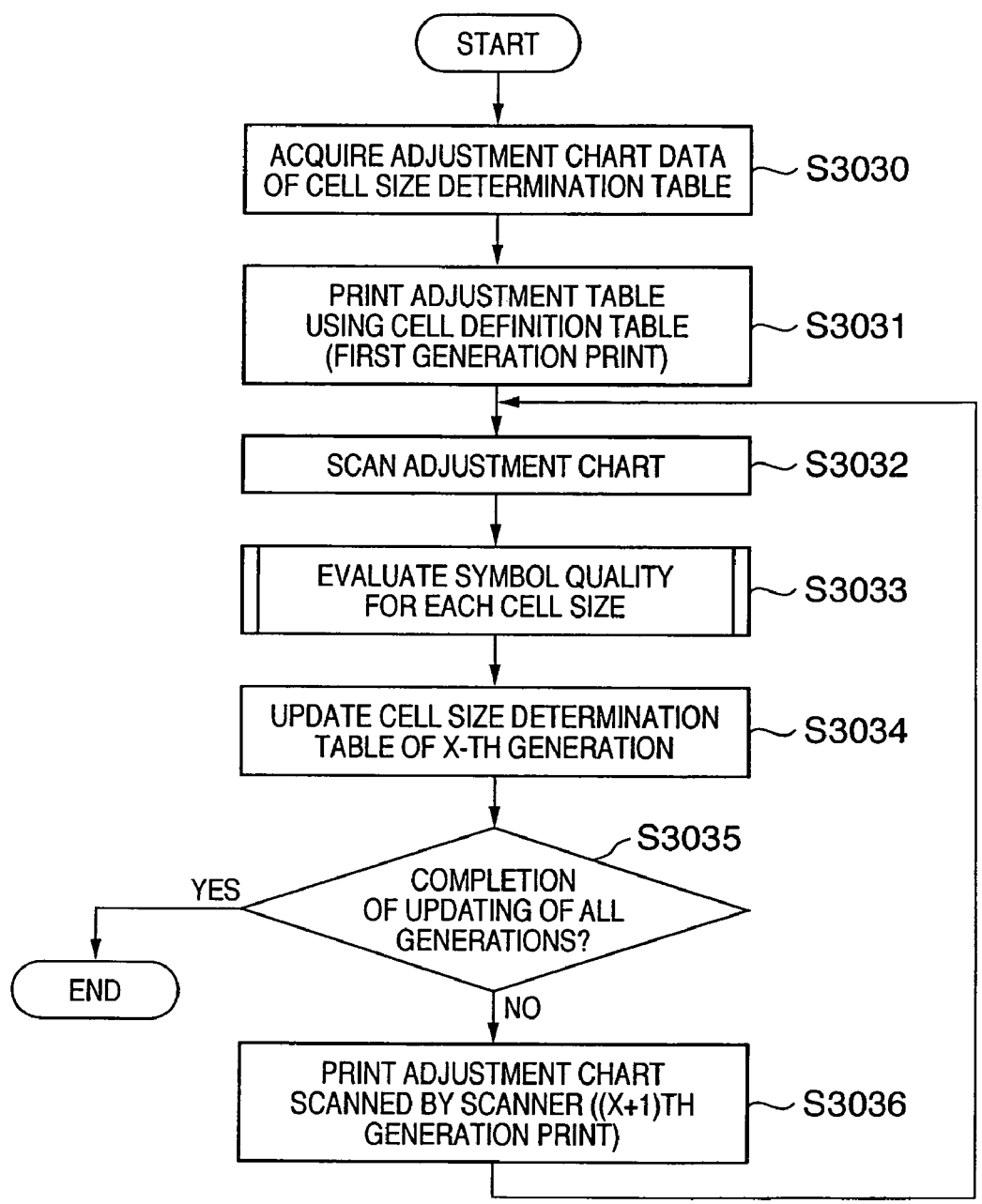
FIG. 12 is a flowchart for explaining adjustment of a cell size determination table.

FIG. 12 is a flowchart for explaining adjustment of the cell size determination table.

The CPU 108 acquires adjustment chart data of the cell size determination table from the data ROM 107 or HDD 103 (S3030).

Figure 13:
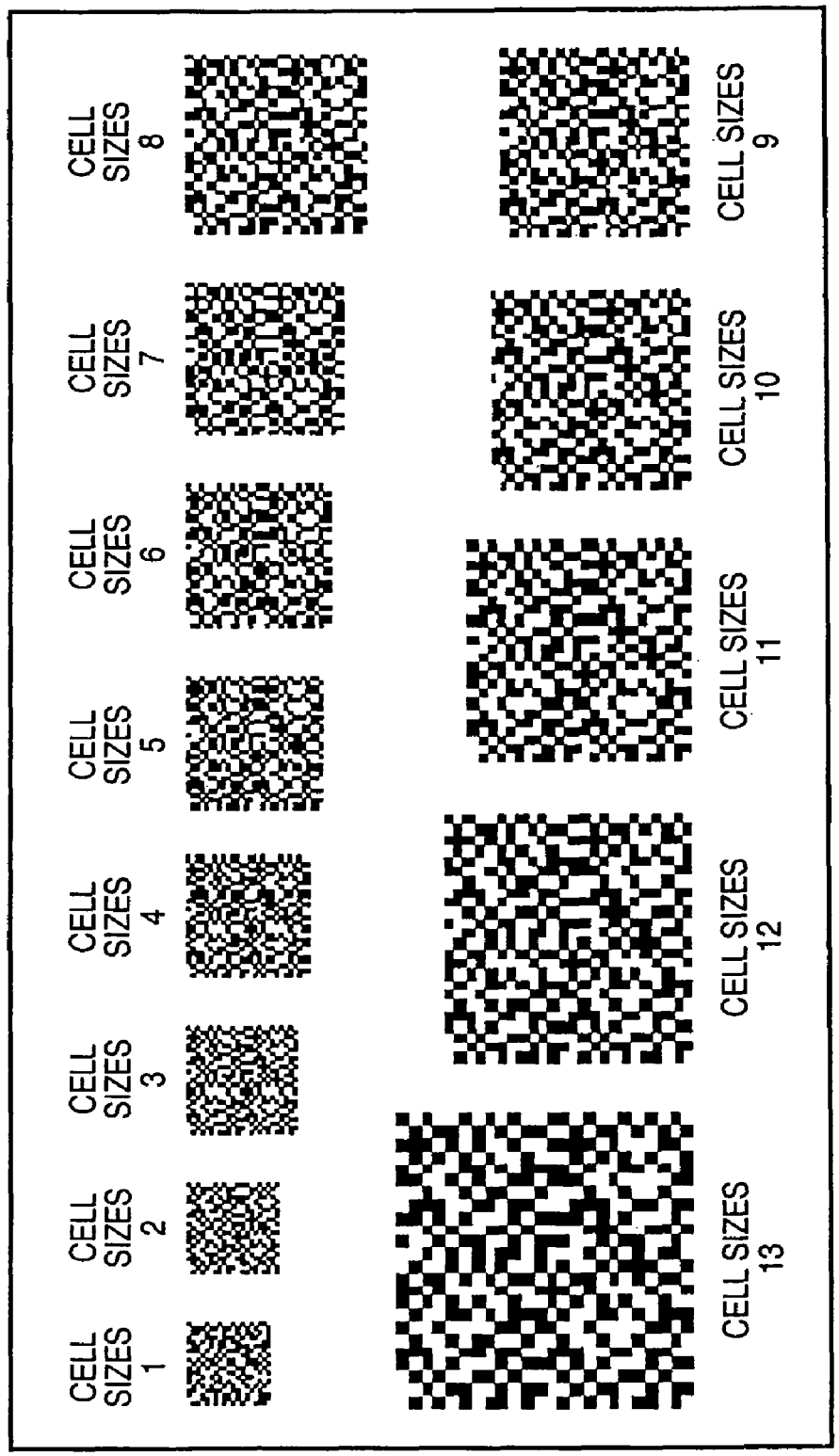
FIG. 13 shows an example of an adjustment chart of the cell size determination table.

FIG. 13 shows an example of the adjustment chart of the cell size determination table, and standard codes for adjustment, to which information is appended to have an error correction amount "middle" for respective cell sizes, are printed. Note that the standard code for adjustment is an information code formed for adjustment, in which black and white cells are constantly distributed in a region that expresses each code size.

The CPU 108 outputs the adjustment chart data to the printer engine 105 using the cell definition table to print the adjustment chart (S3031). The CPU 108 scans the image of the printed adjustment chart using the scanner 100, and records the read image of the adjustment chart in the RAM 109 as an image recording signal (S3032).

Note that the cell definition table upon printing the adjustment chart defines a cell shape according to the print performance of the printer engine 105 so as to print an ideal (or nearly ideal) cell shape. In other words, the cell definition table in which the definitions of cell shapes are adjusted by the above-adjustment of the cell definition table is preferably used.

The CPU 108 then analyzes the degree of match between the image recording signal of the adjustment chart and the adjustment chart data, and evaluates the scanning quality (symbol quality) on the print medium for each code information formed by each cell size (S3033). Note that the evaluation method will be described later. Based on the evaluation result, the CPU 108 updates the cell size determination table of the Xth generation for respective information codes of respective cell sizes (S3034).

The CPU 108 checks if updating for the prescribed number of generations is complete (S3035). The Xth generation means the number of times of printing (the number of times of scanning). For example, if the printed adjustment chart is scanned in step S3031, X=1, i.e., the first generation. If updating for the prescribed number of generations is complete, the processing ends. If updating for the prescribed number of generations is not complete yet (generations to be updated still remain), the CPU 108 outputs the image recording signal saved in the RAM 109 to the printer engine 105 to print the adjustment chart of the next generation (S3036). The process returns to step S3032, and the above processing is repeated for the "X+1"-th generation.

Figure 14:
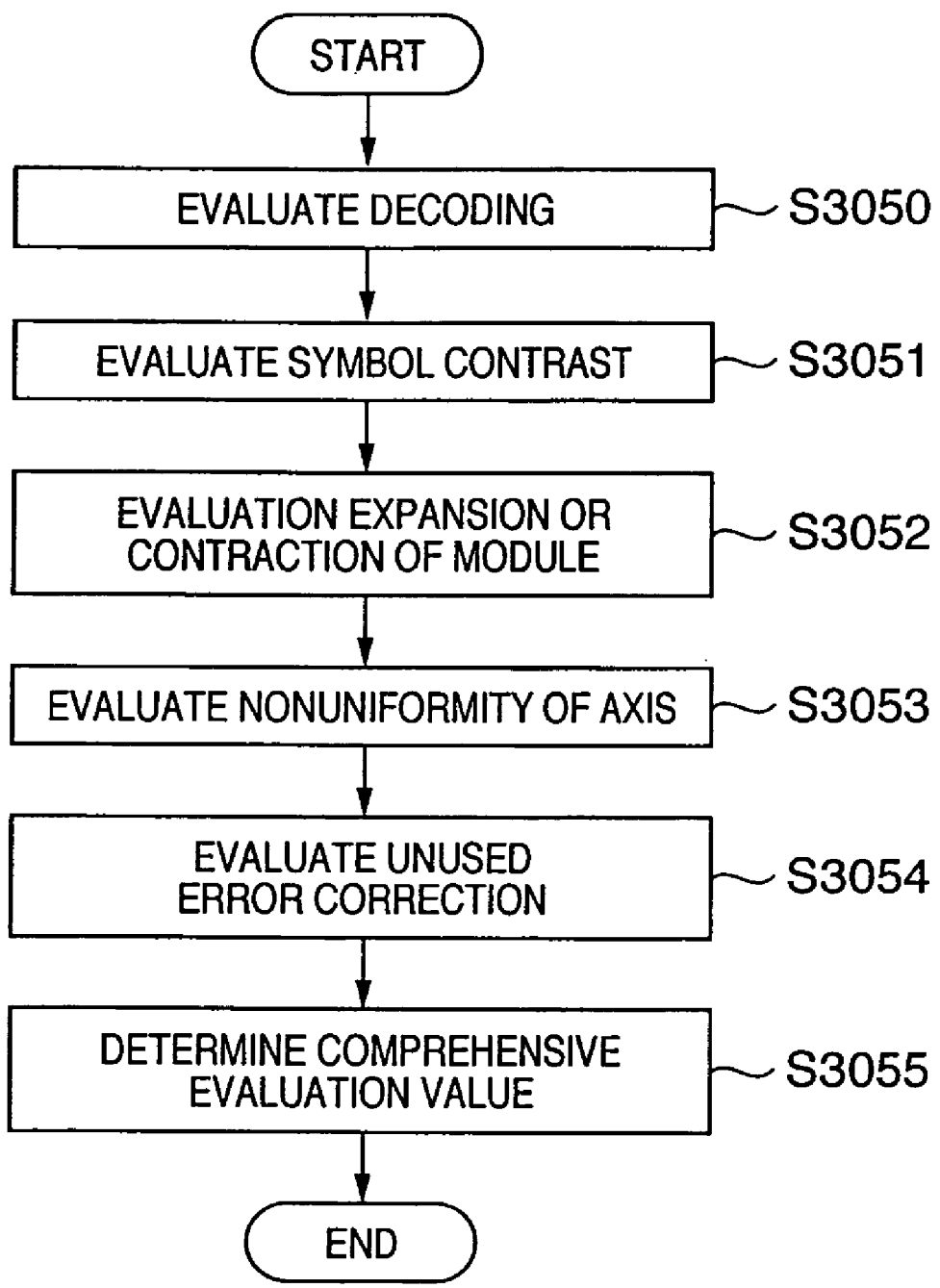
FIG. 14 is a flowchart showing a processing example for evaluating the symbol quality of code information formed using respective cell sizes.

FIG. 14 is a flowchart showing a processing example for evaluating the symbol quality of code information formed based on each cell size, i.e., processing to be executed for each code information on the adjustment chart. Note that the evaluation procedure of the symbol quality shown in FIG. 14 is the method of evaluating the print quality based on the JIS standard.

The CPU 108 checks if code information whose position on the adjustment chart is specified can be decoded by a decoding algorithm specified by the JIS standard (S3050). If the code information can be decoded, the CPU 108 evaluates that code information as grade A; otherwise, the CPU 108 evaluates it as grade F.

Next, the CPU 108 evaluates symbol contrast SC for the code information (S3051). In a practical evaluation method, the averages of the reflectivities of pixels 10% the darkest part in the code information (symbol) and those 10% the brightest part are calculated to compute the difference between the averages as symbol contrast SC, and to determine grades A to F as follows. Note that four grades A to D are defined acceptable, grade F is defined rejected, and no grade E exists.

Grade A: $SC \geq 70\%$
Grade B: $SC \geq 55\%$
Grade C: $SC \geq 40\%$
Grade D: $SC \geq 20\%$
Grade F: $SC < 20\%$ Next, the CPU 108 evaluates expansion or contraction of a module (S3052).

Expansion or contraction of the module means the expansion/contraction ratio of the code information in the horizontal or vertical direction, and the CPU 108 calculates a maximum expansion/contraction ratio D' of a timing pattern to the average cell pitch by:

D=maximum expanded or contracted cell/average cell pitch $$D'=(D-0.5)/0.15$$

Note that the timing pattern is a predetermined pattern data sequence used to attain alignment in the horizontal and vertical directions.

Based on D', the CPU 108 determines grades A to F using the following conditions:

Grade A: $-0.50 < D' < 0.50$
Grade B: $-0.70 < D' < 0.70$
Grade C: $-0.85 < D' < 0.85$
Grade D: $-1.00 < D' < 1.00$
Grade F: $D' \leq -1.00$ or $D' \geq 1.00$ Next, the CPU 108 evaluates nonuniformity of the axis of the code information (S3053). An evaluation value AN of nonuniformity of the axis is expressed using a distances Xavg (distance in the X-direction of the code information) and Yavg (distance in the Y-direction of the code information) between the centers of the code information by:

$$AN=|(Xavg-Yavg)/(Xavg-Yavg)/2|$$

The CPU 108 determines grades A to F based on AN using the following conditions:

Grade A: $AN \leq 0.06$
Grade B: $AN \leq 0.08$
Grade C: $AN \leq 0.10$
Grade D: $AN \leq 0.12$
Grade F: $AN > 0.12$ Next, the CPU 108 evaluates unused error correction (S3054). The CPU 108 decodes the code information, and evaluates it based on the use amount of error correction. An unused error correction amount is given by:

$$UEC = 1.0 - 2t/d$$

where t is the actual number of errors upon scanning code information, and d is the number of error correction codewords set in the code.

The CPU 108 then determines grades A to F based on UEC using the following conditions:

Grade A: $UEC \geq 0.62$.
Grade B: $UEC \geq 0.50$
Grade C: $UEC \geq 0.37$
Grade D: $UEC \geq 0.25$
Grade F: $UEC < 0.25$ Finally, the CPU 108 determines a comprehensive evaluation value of the code information based on the evaluation values obtained in steps S3050 to S3054 (S3055). For example, the worst case of the evaluation values obtained in steps S3050 to S3054 may be used as the comprehensive evaluation value.

The CPU 108 repeats the aforementioned processing for all pieces of code information on the adjustment chart scanned in step S3032, and calculates the evaluation values of the code information. Note that the code information on the adjustment chart is expressed for each cell size. FIG. 15 shows an example of the evaluation results of the symbol qualities of the Xth generation.

Based on the evaluation results, the CPU 108 updates the cell size determination table for the Xth generation (S3034). When the quality of the Xth generation is guaranteed based on the cell sizes and comprehensive evaluation shown in FIG. 15, the cell size is 8 or more so as to guarantee quality A. In order to guarantee quality B, the cell size is 7 or more. The CPU 108 repeats the above decision making for qualities A to F to update the cell size determination table.

The adjustment required to guarantee the print quality of the code information has been explained based on the QR code® as a representative two-dimensional code. For this reason, the evaluation method based on the JIS evaluation criteria is applied. However, the cell size determination table and its adjustment are not limited to the JIS evaluation criteria. Of course, the JIS evaluation criteria cannot be applied to two-dimensional codes other than the QR code®. In this case, the evaluation criteria of code information are set and evaluated based on, e.g., determination error results of cells which form the code information, fattening or thickening degree of print cells, or the like, thus guaranteeing the print quality.

In this way, since calibration for printing of code information is done, an optimal cell definition table and cell size determination tables to printing of code information can be obtained. Therefore, code information which has a minimum required code size and a smaller cell size can be generated, offensive feeling to the viewer of the printed matter can be reduced, and the degree of freedom in layout of code information can be improved.

Second Embodiment

Image processing according to the second embodiment of the present invention will be described below. Note that the same reference numerals in the second embodiment denote the same parts as in the first embodiment, and a detailed description thereof will be omitted.

In the adjustment of the cell definition table of the first embodiment, the CPU 108 analyzes (actually measures) the cell shapes of all pieces of code information on the printed adjustment chart and updates the definitions of the cell shapes. The print quality of each cell largely depends on performance such as fattening or thickening of dots by the printer engine 105. Therefore, the definitions of the cell shapes can be updated by detecting fattening or thickening of dots by the printer engine 105.

Figure 16:
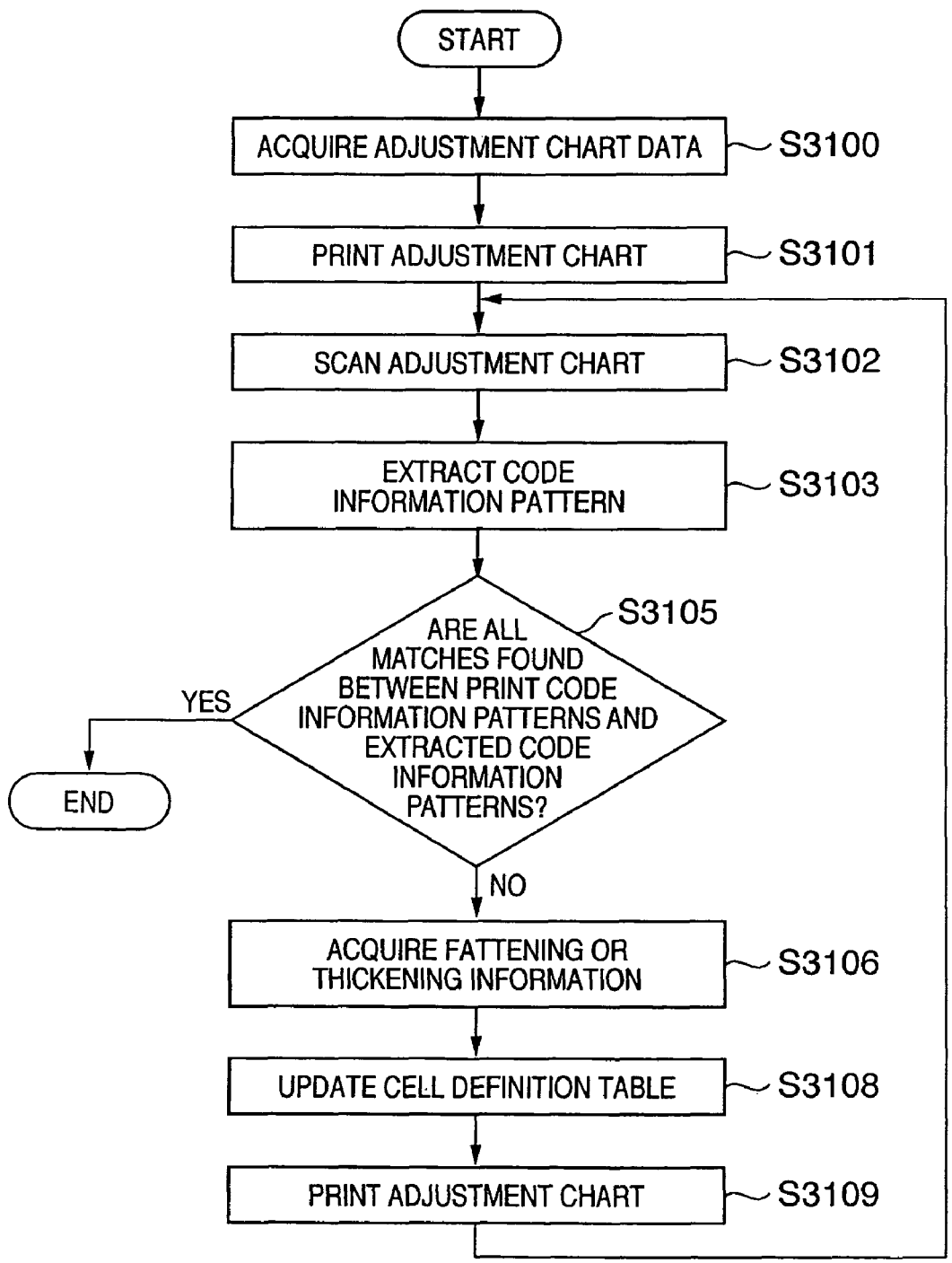
FIG. 16 is a flowchart showing the processing for updating the cell definition table by detecting fattening or thickening of dots according to the second embodiment.

FIG. 16 is a flowchart showing processing for updating the cell definition table by detecting fattening or thickening of dots by the printer engine 105. The CPU 108 executes this processing.

The CPU 108 acquires adjustment chart data of the cell definition table from the data ROM 107 or HDD 103 (S3100).

Figure 17:
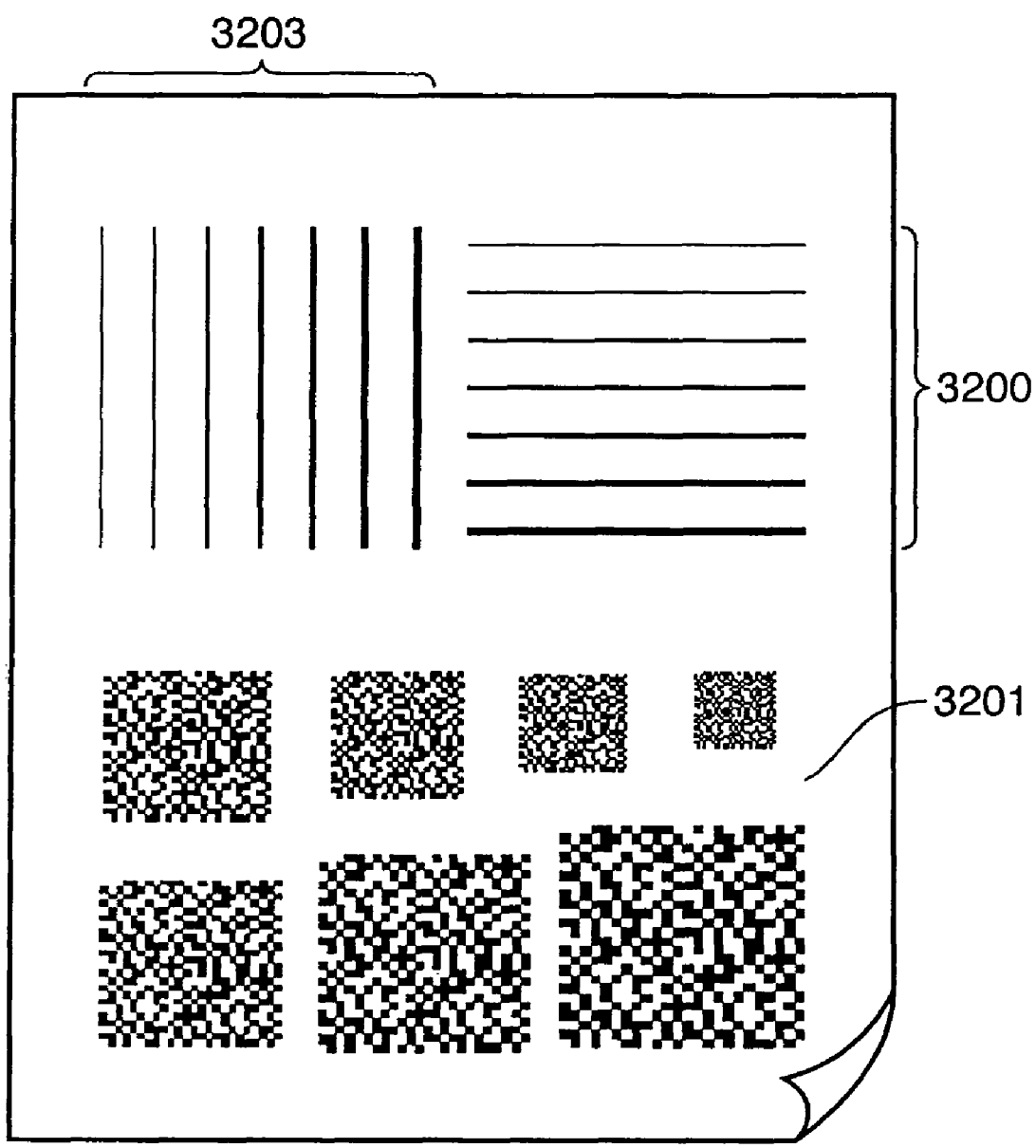
FIG. 17 shows an example of an adjustment chart.

FIG. 17 shows an example of the adjustment chart. Reference numeral 3201 denotes the aforementioned standard codes for adjustment, which are formed to have respective cell sizes. Reference numerals 3200 and 3203 denote horizontal and vertical lines having widths corresponding to the respective cell sizes.

The CPU 108 outputs the adjustment chart data to the printer engine 105 using the acquired cell definition table, and prints the adjustment chart (S3101). The CPU 108 scans the image of the printed adjustment chart using the scanner 100, and records the read image of the adjustment chart in the RAM 109 as an image recording signal (S3102). The CPU 108 specifies the position of the code information on the adjustment chart from the image recording signal and extracts that code information pattern (S3103). The code information for each cell size exists on the adjustment chart, and the code information pattern is extracted for each cell size.

The CPU 108 compares the extracted code information pattern (to be referred to as "extracted pattern" hereinafter) with the code information pattern on the adjustment chart data (to be referred to as "print pattern" hereinafter) (S3104). The CPU 108 makes comparison for each code information pattern formed for each cell size. If all the extracted patterns match the print patterns as a result of comparison, the adjustment ends.

On the other hand, if the extracted patterns and the print patterns include mismatches, the CPU 108 detects fattening or thickening information using the image of the scanned adjustment chart (S3106). That is, the CPU 108 detects fattening or thickening of lines from the horizontal lines 3200 and vertical lines 3203 which have widths corresponding to respective cell sizes shown in FIG. 17. Note that the CPU 108 detects the fattening or thickening information in the horizontal direction from the horizontal lines 3200, and detects the fattening or thickening information in the vertical direction from the vertical lines 3203. Of course, the CPU 108 detects the fattening or thickening information for each cell size.

The CPU 108 updates the cell definition table using the detected fattening or thickening information for the code information (which is formed for each cell size) of each cell size corresponding to a mismatch between the extracted pattern and the print pattern (S3108).

FIG. 18 is a view for explaining an example of processing for updating a cell shape table in accordance with fattening or thickening information, and shows the characteristics of an ideal cell shape depending on the print performance of the printer engine 105 in black cell condition 1 (see FIG. 5).

Note that the characteristics of an ideal cell shape depending on the print performance of the printer engine 105 can be obtained using the same processing as in the adjustment of the cell definition table described using FIG. 9 in association with, e.g., a default cell size (a maximum cell size in this case) of cell condition 1.

The definition of each cell in cell condition 1 can be obtained by resolution-converting an ideal cell shape to each cell size. For example, assume that the CPU 108 obtains "+ΔT3" in the horizontal direction as the fattening or thickening information of code information having cell size 3 in step S3106. In other words, the cell size in the horizontal direction is "1+ΔT3." The image size of the ideal cell shape shown in FIG. 18 is temporarily multiplied by "1/(1+ΔT3)" to resolution-convert it to cell size 3. In this way, the cell definition of cell size 3 can be obtained, and the cell definition table is updated using a new cell definition of cell size 3. The CPU 108 applies this updating processing to cell definitions having cell sizes corresponding to mismatches between the extracted and print patterns in step S3108.

The CPU 108 prints the adjustment chart using the updated cell shape table (S3109), and the process returns to step S3102. The CPU 108 scans the adjustment chart printed in step S3109 again in step S3102, and repeats the processes in steps S3102 to S3109 until all the extracted patterns match the print patterns in step S3105.

In this way, the cell definition table can be updated in accordance with the fattening or thickening performance of the printer engine 105.

Note that if it is difficult to obtain matches between all the extracted patterns and print patterns in step S3105, and if the ratio of matches between the extracted patterns and print patterns is equal to or larger than a predetermined value, all matches can be determined. Alternatively, if all pieces of code information are decodable or if the use amount of the correction code is equal to or smaller than a predetermined value, all matches may be determined.

Even when the cell definition table is optimized, the performance of the printer engine 105 is limited, and all matches between the extracted patterns and print patterns cannot often be obtained. In consideration of such case, the CPU 108 may forcibly end the processing after it repeats decision making in step S3105 a prescribed number of times.

Other Embodiment

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2005-311803, filed Oct. 26, 2005, which is hereby incorporated by reference herein in its entirety.

What is claimed is:

1. An apparatus comprising:
a printing section, configured to print a plurality of predetermined two-dimensional code data on a sheet, wherein at least two of the plurality of two-dimensional code data have cell sizes different from each other;
a reading section, configured to read an image from the sheet as a result of the printing so as to obtain image data;
a decoding section, configured to decode the plurality of two-dimensional code data contained in the image data obtained by the reading section; and
a selecting section, configured to select a minimum cell size from cell sizes of two-dimensional code data that can be decoded by the decoding section,
wherein each two-dimensional code data contains a timing pattern,
wherein the selecting section calculates a maximum expansion/contraction ratio of the timing pattern of each two-dimensional code data contained in the image data, and
wherein the selecting section selects the minimum cell size from cell sizes of the two-dimensional code data that can be decoded by the decoding section, and having a maximum expansion/contraction ratio that falls within a predetermined ratio range.

2. The apparatus according to claim 1, wherein the selecting section calculates non-uniformity of axis of each two-dimensional code data contained in the image data using distances in the X-direction and the Y-direction of the two-dimensional code data, and
wherein the selecting section selects the minimum cell size from cell sizes of the two-dimensional code data that can be decoded by the decoding section, having the maximum expansion/contraction ratio that falls within the predetermined ratio range, and having a non-uniformity of axis that falls within a predetermined non-uniformity range.

3. The apparatus according to claim 2, wherein the selecting section calculates a value indicating contrast of each two-dimensional code data contained in the image data, and
wherein the selecting section selects the minimum cell size from cell sizes of the two-dimensional code data that can be decoded by the decoding section, having the maximum expansion/contraction ratio that falls within the predetermined ratio range, having the non-uniformity of axis that falls within the predetermined non-uniformity range, and having a calculated value indicating contrast that is greater than a predetermined value.

4. The apparatus according to claim 3, wherein the selecting section calculates an unused error correction amount when each two-dimensional code data contained in the image data is decoded, and wherein the selecting section selects the minimum cell size from cell sizes of the two-dimensional code data that can be decoded by the decoding section, having the maximum expansion/contraction ratio that falls within the predetermined ratio range, having the non-uniformity of axis that falls within the predetermined non-uniformity range, having the calculated value that is greater than the predetermined value, and having an unused error correction amount that is greater than a predetermined amount.

5. The apparatus according to claim 1, wherein the selected minimum cell size is used to generate two-dimensional codes.

6. A method comprising:

printing a plurality of predetermined two-dimensional code data on a sheet, wherein at least two of the plurality of two-dimensional code data have cell sizes different from each other;

reading an image from the sheet as a result of the printing so as to obtain image data;

decoding the plurality of two-dimensional code data contained in the image data obtained in the reading step; and selecting a minimum cell size from cell sizes of two-dimensional code data that can be decoded in the decoding step, wherein each two-dimensional code data contains a timing pattern, wherein, in the selecting step, a maximum expansion/contraction ratio of the timing pattern of each two-dimensional code data contained in the image data is calculated, and wherein, in the selecting step, the minimum cell size is selected from cell sizes of the two-dimensional code data that can be decoded in the decoding step, and having a maximum expansion/contraction ratio that falls within a predetermined ratio range.

7. The method according to claim 6, wherein the selected minimum cell size is used to generate two-dimensional codes.

8. A non-transitory computer readable medium retrievably storing a computer-executable program for causing a computer to perform a method comprising the steps of:

printing a plurality of predetermined two-dimensional code data on a sheet, wherein at least two of the plurality of two-dimensional code data have cell sizes different from each other;

reading an image from the sheet as a result of the printing so as to obtain image data;

decoding the plurality of two-dimensional code data contained in the image data obtained in the reading step; and selecting a minimum cell size from cell sizes of two-dimensional code data that can be decoded in the decoding step, wherein each two-dimensional code data contains a timing pattern, wherein, in the selecting step, a maximum expansion/contraction ratio of the timing pattern of each two-dimensional code data contained in the image data is calculated, and wherein, in the selecting step, the minimum cell size is selected from cell sizes of the two-dimensional code data that can be decoded in the decoding step, and having a maximum expansion/contraction ratio that falls within a predetermined ratio range.

9. The non-transitory computer readable medium according to claim 8, wherein the selected minimum cell size is used to generate two-dimensional codes.

* * * * *